(No Model.)

G. S. AGEE.
Road Scraper.

No. 240,633.  Patented April 26, 1881.

WITNESSES:
Donn P. Twitchell
C. Sedgwick

INVENTOR:
G. S. Agee
BY Munn & Co.
ATTORNEYS.

N. PETERS, PHOTO-LITHOGRAPHER, WASHINGTON, D. C.

UNITED STATES PATENT OFFICE.

GEORGE S. AGEE, OF MINT HILL, MISSOURI.

ROAD-SCRAPER.

SPECIFICATION forming part of Letters Patent No. 240,633, dated April 26, 1881.

Application filed June 30, 1880. (No model.)

*To all whom it may concern:*

Be it known that I, GEORGE SPARREL AGEE, of Mint Hill, in the county of Osage, State of Missouri, have invented a new and useful Improvement in Road-Scrapers, of which the following is a specification.

Figure 1:
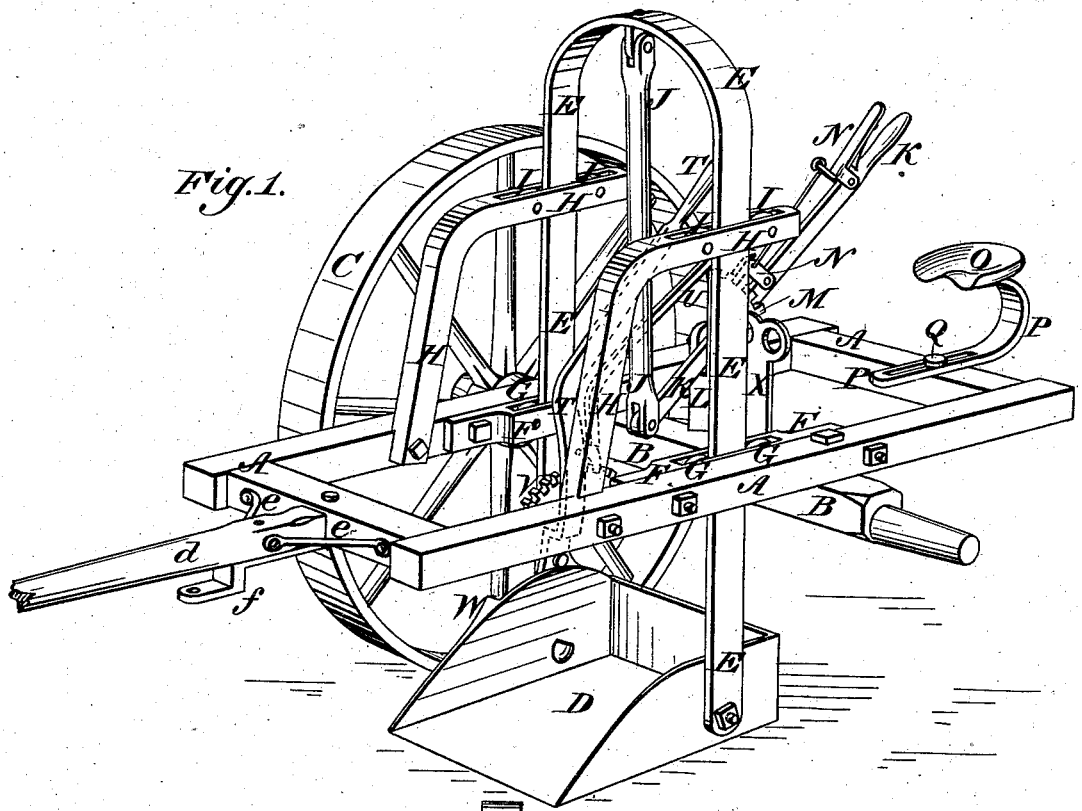
Figure 2:
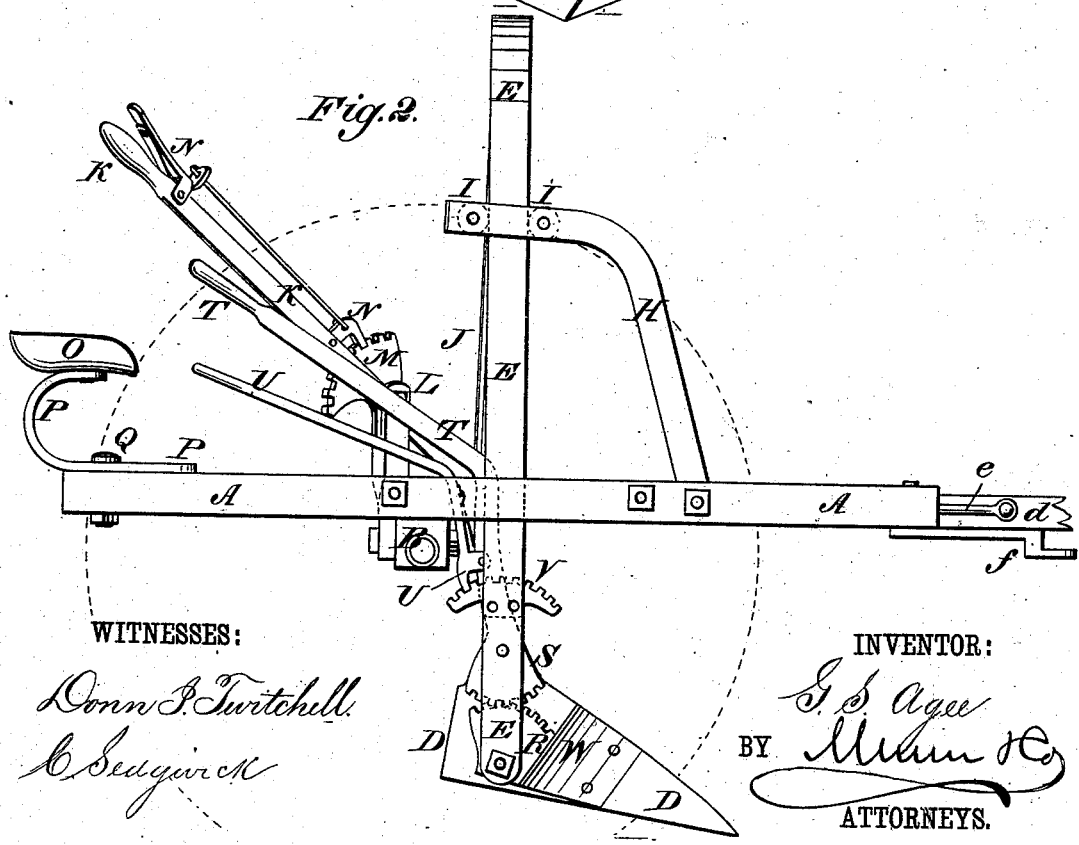

Figure 1 is a perspective view of the improvement. Fig. 2 is a side elevation.

The object of this invention is to furnish an improved scraper for moving dirt from one place to another for grading roads and other purposes, which shall be simple in construction, easily operated, and effective in operation.

Similar letters of reference indicate corresponding parts.

A represents a rectangular frame, of a width a little greater than the width of the scraper to be used, and of a convenient length. The side bars of the frame A, a little in the rear of their centers, are bolted to the axle B of the wheels C.

The scraper D may be made wholly of metal, or partly of metal and partly of wood. The scraper D, at the middle part of its sides, is pivoted to and between the ends of the parallel arms of the arched or U bar E. The parallel arms of the arched bar E pass through the slots of the keepers F, attached to the middle parts of the inner sides of the side bars of the frame A. The slots of the keepers F are made long, and in them are pivoted rollers G, to rest against the front and rear edges of the arms of the bar E, to lessen the friction as the said bar E is raised and lowered.

To the inner sides of the side bars of the frame A, a little in front of the keepers F, are bolted the lower ends of two standards, H, the upper parts of which are bent to the rearward, and are slotted for the passage of the arms of the bar E, so as to hold the said arms vertical as the bar E is moved up and down. The slots of the standards H are made long, and in their end parts are pivoted wheels or rollers I, to rest against the edges of the arms of the bar E and lessen the friction as the said bar E is raised and lowered.

To the center of the bar E is hinged the upper end of a rod, J, the lower end of which is hinged to the forward end of a lever, K. The lever K is fulcrumed to a support, L, attached to the axle B.

To the upper part of the support L is attached, or upon it is formed, a bar or plate, M, the upper edge of which is curved upon the arc of a circle, and has notches or teeth formed in it to receive the lever spring pawl N, attached to the lever K, so as to hold the scraper D securely in any position into which it may be raised or lowered. The lever K extends back in a diagonal direction, so that its rear end will not be in the way of the driver's seat O, and at the same time can be readily reached and operated by the driver from his seat. The driver's seat O is attached to the upper arm of a U-shaped bar, P, the lower arm of which rests upon the upper side of the rear cross-bar of the frame A, and is secured to it by a bolt, Q. The lower arm of the U-shaped bar P is made longer than the upper arm, and is slotted longitudinally to receive the fastening-bolt Q, so that the seat O can be adjusted to cause the driver's weight to balance the machine.

To the lower part of one side of the scraper D is attached a gear-segment, R, the teeth of which mesh into the teeth of the gear-segment S, attached to or formed upon the lower end of the lever T. The lever T is pivoted to the arm of the arched bar E, so that scraper D can be tilted to discharge the load, and can have its mouth inclined upward to prevent the load from spilling out while being carried by operating the lever T. The upper part of the lever T is bent to the rearward, so that it can be conveniently reached and operated by the driver.

To the lever T is pivoted a spring lever-pawl, U, which engages with the notched catch-bar or plate V, attached to the arm of the arched bar E, so that the scraper will be held securely in position, and its position will be unaffected by its up-and-down movement in connection with the up-and-down movement of the arched bar E.

To the forward part of the side of the scraper D is attached a shield, W, to protect the segments R S from the dirt.

To the middle part of the axle B is attached a standard, X, having two holes formed in, or two loops or rings attached to, its upper end, to receive the reins and prevent them from becoming entangled with the mechanism.

*d* is the tongue, having its rear end mortised into the center of the forward cross-bar of the frame A and strengthened against lateral strain by braces e, which are attached to it and the cross-bar. The strap f is attached to the tongue rigidly on its lower side, so that the tendency of the draft is downward, thus relieving the strain on the horses' necks.

Having thus fully described my invention, I claim as new and desire to secure by Letters Patent—

1. A road-scraper constructed substantially as herein shown and described, consisting of the carriage A B C, the scraper D, the arched bar E, the keepers F, having rollers G, the bent and slotted guide-standards H, having rollers I, the connecting-rod J, the lever K, having spring lever-pawl N, and the catch-plate M, for raising, lowering, and holding the scraper, the gear-segments R S, the lever T, having spring lever-pawl U, and the catch-plate V, for tilting and holding the scraper, as set forth.

2. In a road-scraper, the combination, with the carriage A B C and the scraper D, of the arched bar E, the keepers F, having rollers G, and the bent and slotted guide-standards H, having rollers I, substantially as herein shown and described, whereby the scraper is adjustably connected with the carriage, as set forth.

3. In a road-scraper, the combination, with the carriage A B C, the scraper D, and the arched bar E, of the connecting-rod J, the lever K, having spring lever-pawl N, and the catch-plate M, substantially as herein shown and described, whereby the scraper can be raised, lowered, and supported, as set forth.

4. In a road-scraper, the combination, with the scraper D, the arched bar E, and the gear-segments R S, of the shield W, substantially as herein shown and described, whereby the gear-segments R S are protected from the dirt, as set forth.

GEORGE SPARREL AGEE.

Witnesses:
DAVID BUNCH,
MARCUS BROWN.